United States Patent

[11] 3,586,227

| [72] | Inventor | Harald Krogsrud<br>Gjettum, Norway |
|---|---|---|
| [21] | Appl. No. | 824,036 |
| [22] | Filed | May 13, 1969 |
| [45] | Patented | June 22, 1971 |
| [73] | Assignee | Elektrokemisk A/S |
| [32] | Priority | May 21, 1968 |
| [33] | | Norway |
| [31] | | 1983/68 |

[54] APPARATUS FOR CONTINUOUS FEEDING OF CYLINDRICAL BODIES
10 Claims, 2 Drawing Figs.

| [52] | U.S. Cl. | 226/170 |
|---|---|---|
| [51] | Int. Cl. | B65h 17/24 |
| [50] | Field of Search | 214/338;<br>226/170, 168 |

[56] References Cited
UNITED STATES PATENTS

| 2,112,865 | 4/1938 | Putman | 214/338 |
|---|---|---|---|
| 2,789,687 | 4/1957 | Cuccio | 226/170 X |

FOREIGN PATENTS

| 1,384,833 | 11/1964 | France | 226/168 |

*Primary Examiner*—Allen N. Knowles
*Attorney*—Eyre, Mann & Lucas

ABSTRACT: One or more continuous flexible belts are disposed on housing-mounted rollers to retain a substantially cylindrical body with a portion of the belt(s). Each belt forms an angle between 0° and 90° with the axis of the body. One surface of each belt is moved about the circumference of the body, thereby causing the cylindrical body to move axially with respect to each belt.

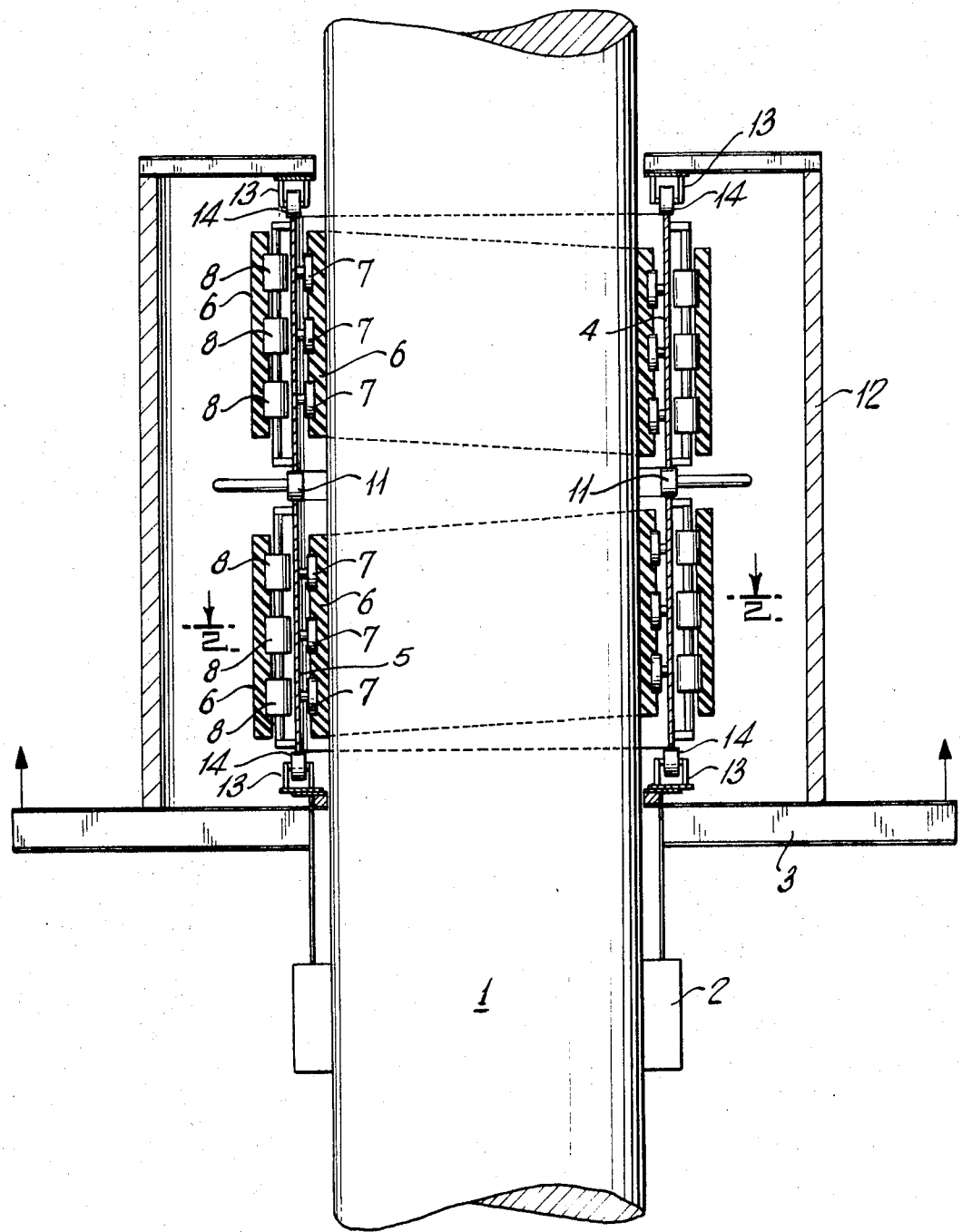

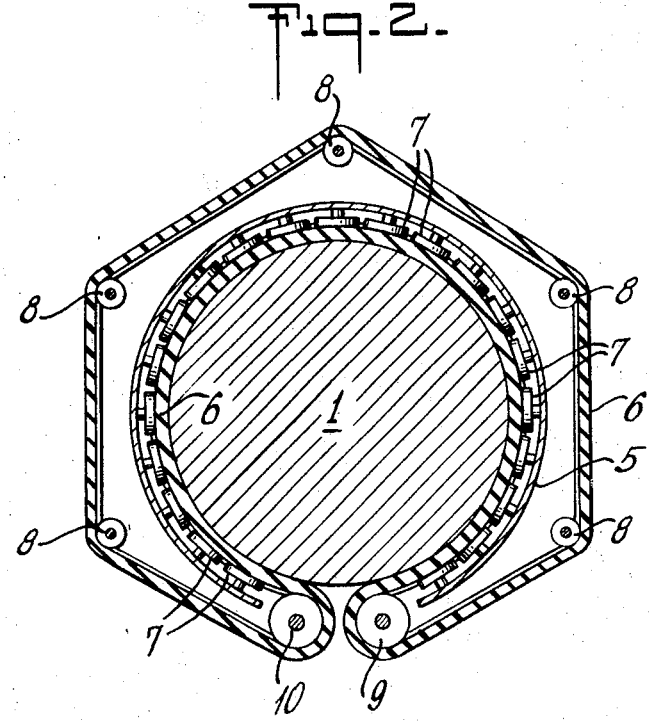

APPARATUS FOR CONTINUOUS FEEDING OF CYLINDRICAL BODIES

The present invention relates to apparatus for continuous feeding of cylindrical bodies, and has utility in such applications as raising and lowering electrodes in electric smelting furnaces.

The apparatus embodying the invention comprises at least one endless belt or band of rubber or similar flexible material which runs over and around two end rollers and is preferably arranged around a cylindrical body as a helix. The belt or band is preferably of such a length that the two end rollers will be located close to each other. The belt or band will thus form inner and outer portions which are substantially parallel to one another. The flat outer surface of the inner portion of the belt will always grip the surface of the cylinder. The belt or band can be tightened around the cylindrical body by conventional means until that friction force which is necessary to support the cylindrical body is obtained.

The inner surface of the belt is preferably profiled so that the weight of the cylindrical body can be transmitted through the belt to suspending wheels, rollers, cylinders or other rotary or sliding members which are mounted on a housing. The return part of the belt can be guided by the same suspension members or by separate members. The one end roller of the belt is staggered in relation to the other in the axial direction of the cylinder, and the interposed suspension members along the circumference of the cylinder are correspondingly staggered in relation to each other so that the belt, if laid flat, would form an angle between 0° and 90° with the axis of the cylinder.

When the housing is rotated around the cylindrical body retained therein, the belt will move along the circumference of the cylinder, and as the belt is forming a helical plane in contact with the cylinder, the latter will simultaneously be moved longitudinally. With a vertical cylinder and the belt rising counterclockwise, the housing will move upward with respect to the cylinder when the housing is rotated clockwise. With counterclockwise rotation of the housing, the housing will move downward with respect to the cylinder. When the belt rises in the clockwise direction, these movements will be reversed.

In the disclosed embodiment, the housing is rigidly connected to a supporting device in relation to which it cannot be moved in vertical direction. When the housing is rotated, the cylinder will be forced to move upwards or downwards, depending on the rotation direction of the housing. That torque which is transmitted to the cylinder by rotation of the housing can be counteracted by employment of two belt systems, with oppositely wound belts. The housings are then arranged one above the other and rotated in opposite directions. The two belt systems will then move the cylinder in the same vertical direction with little or no rotation of the cylinder.

A preferred embodiment of the present invention will be described below in connection with electrodes in electric smelting furnaces where it can be used for continuous lowering of the electrode in relation to the electrode holder in correspondence with the electrode consumption in the furnace. A better understanding of the present invention and the disclosed embodiment thereof may be had by reference to the accompanying drawings, of which:

FIG. 1 shows a vertical section through the transport apparatus and suspension frame.

FIG. 2 shows a horizontal section of the transport apparatus through the line 2-2 in FIG. 1.

In FIGS. 1 and 2, the electrode 1 and the current-carrying electrode holders 2 can be of any known type. Suspension frame 3 carries the electrode holder. The suspension frame 3 is suspended by the electrode hoist, which is not shown in the drawing. In the figures, the feeding (lowering) equipment is also suspended by the suspension frame, but it is of course also possible to suspend the lowering equipment in other ways. Two housings 4 and 5 are rotatably connected to the suspension frame 3. Each housing contains an endless belt 6 of rubber or similar flexible material. As indicated in FIG. 1, the two belts define helixes which wind in opposite directions.

The belt or band 6, illustrated in FIG. 1, has several tracks or channels on its inner surface which engage a number of wheels 7 and rollers 8 which have profiles which enable such engagement. Common wheels, rollers, belt rollers and other known rolling or sliding arrangements can, of course, also be used. As shown in FIG. 2, end rollers 9 and 10 have a sufficiently large diameter to transport the belt 6 from within the housing 5, where it is supported by wheels 7, to the exterior of the housing, where the rollers 8 transport the belt 6 around the housing.

According to the embodiment of FIG. 1, the rotation force is transmitted to the two housings by means of two driving wheels or gears 11, which are arranged between the two housings 4 and 5. The housings are located in their vertical position in relation to the suspension frame 3 by means of the yoke 12, circular channels 13, and wheels 14 mounted on housings 4 and 5 so as to engage the channels 13. By rotation of the wheels or gears 11, the two housings 4 and 5 will be rotated in opposite directions in relation to each other. The mechanical power transmission can be effected in any known way, either commonly as shown or separately for each housing. It is of advantage to employ a continuously variable speed regulator for the force transmission. The driving equipment should be reversible, so that it can be used for lowering as well as raising of the electrode.

The belt system or systems should be so dimensioned that they can suspend and move the maximum weight of the electrode so that the arrangement can be used for holding and raising the electrode in cases where the grip of the electrode holder around the electrode has been completely released.

The invention is above-described in connection with two belt systems for each cylinder but it is of course possible to employ any number of belt systems which are required by the weight and dimensions of the cylinder. It may in some cases be necessary to rotate the housings independently, for instance, by employment of the invention in connection with attachment of prebaked electrode sections. Although the invention has been described in connection with lowering of vertical cylindrical bodies, it is evident that it can also be used for feeding of horizontal cylinders and cylinders which form any angle with the horizontal plane.

The advantages of the present invention, as well as certain changes and modifications to the disclosed embodiment thereof, will be readily apparent to those skilled in the art. It is the applicant's intention to cover all those changes and modifications which could be made to the embodiment of the invention herein chosen for the purposes of the disclosure without departing from the spirit and scope of the invention.

What I claim is:

1. Apparatus for imparting axial motion to substantially cylindrical bodies, said apparatus comprising:
    a. a folded flexible endless belt having inner and outer surfaces and positioned so that a portion of said outer surface is disposed in contact with the body to be moved so as to form an angle that is greater than 0° and less than 90° with the axis of the body; and
    b. supporting means disposed within said belt and operative to support said belt in said position and to enable said outer surface of said belt to travel around the body to be moved.

2. Apparatus according to claim 1 wherein said supporting means comprises:
    a. a housing; and
    b. a first plurality of rollers extending from said housing to engage said inner surface of said belt.

3. Apparatus according to claim 2 wherein said outer surface of said belt is smooth, and said inner surface has at least one continuous track therein for engagement with said first plurality of rollers.

4. Apparatus according to claim 2 wherein a first group of said first plurality of rollers is disposed along the inner surface of said housing, and a second group of said first plurality of rollers disposed along the outer surface of said housing.

5. Apparatus according to claim 2 wherein said supporting means includes a suspension frame in which said housing is rotatably mounted.

6. Apparatus according to claim 5 wherein said housing includes a second plurality of rollers mounted along at least one edge of said housing and said suspension frame includes at least one channel for engagement which said edge-mounted rollers.

7. Apparatus for imparting axial motion to substantially cylindrical bodies comprising:
   a. a first folded flexible endless belt having inner and outer surfaces and positioned so that a portion of said outer surface is disposed in contact with the body to be moved so as to form an angle that is greater than 0° and less than 90° above a plane perpendicular to the axis of the body;
   b. a second folded flexible endless belt inner and outer surfaces and positioned so that a portion of said outer surface is disposed in contact with the body to be moved so as to form an angle that is greater than 0° and less than 90° below a plane perpendicular to the axis of the body; and
   c. first and second supporting means disposed within said first and second belts, respectively, and operative to support said belts in said positions and to enable said outer surface of each belt to move travel around the body to be moved.

8. Apparatus according to claim 7 wherein said first and second supporting means each comprise:
   a. a housing;
   b. a first plurality of rollers extending from said housing to engage the inner surface of the associated belt;
   c. a second plurality of rollers mounted on a first edge of said housing;
   d. a suspension frame including first and second channels for engagement with said second plurality of rollers of each housing; and
   e. drive means operative to enable rotation of said housing.

9. Apparatus according to claim 8 wherein said outer surfaces of said first and second belts are smooth, and said inner surfaces of said first and second belts each have at least one continuous track therein for engagement with said first plurality of rollers.

10. Apparatus according to claim 8 wherein a single drive means common to both said first and second supporting means is in rotary engagement with a second edge of each housing of said first and second supporting means to rotate said housings in opposite directions.